June 23, 1953   C. W. VOGT   2,642,620
METHOD OF AND APPARATUS FOR DEFINING PLASTIC MASSES
Filed Feb. 6, 1950
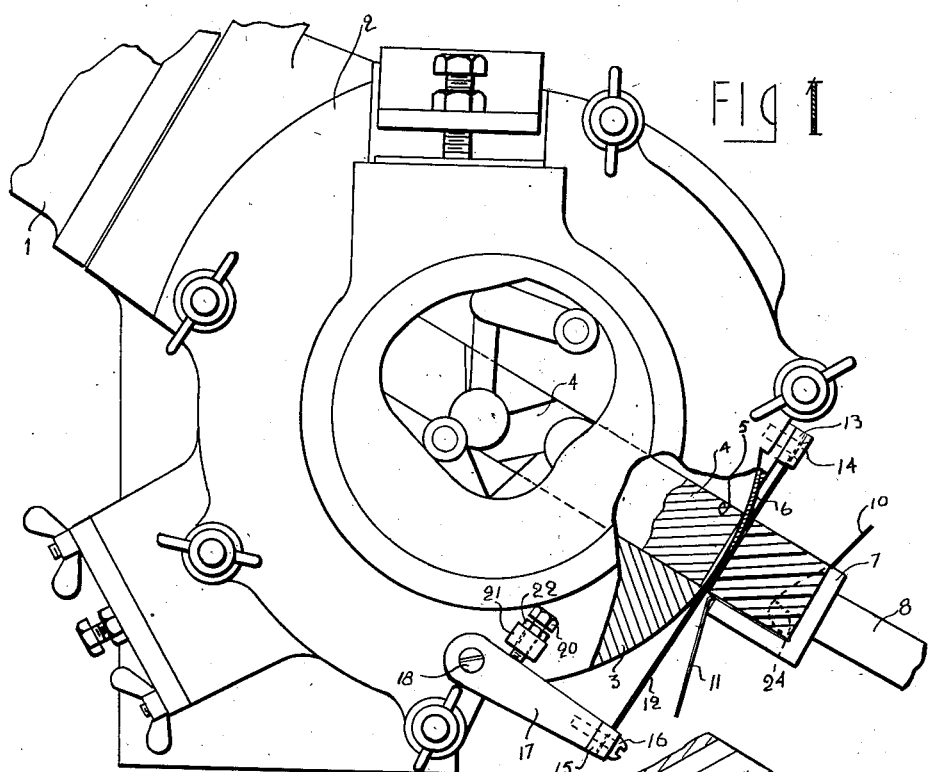
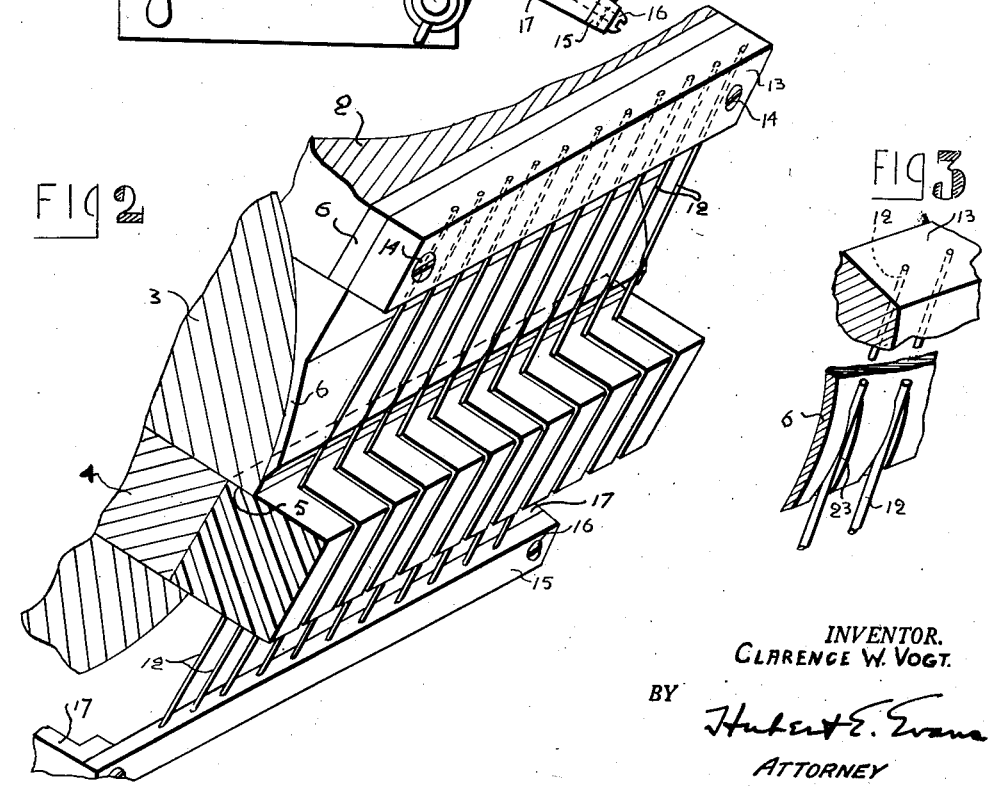
INVENTOR.
CLARENCE W. VOGT.
BY Hubert E. Evans
ATTORNEY Patented June 23, 1953

2,642,620

UNITED STATES PATENT OFFICE 2,642,620

METHOD OF AND APPARATUS FOR DEFINING PLASTIC MASSES

Clarence W. Vogt, Norwalk, Conn.

Application February 6, 1950, Serial No. 142,594

5 Claims. (Cl. 18—4)

The present invention relates to the production and packaging of plastic masses, and in particular to the defining of subdivisions of plastic masses as they are produced and packaged.

It is extremely desirable with plastic materials which are sold as measured and formed individual masses to define such individual masses into suitable subdivisions so that the users may readily apportion the mass into units. Such a practice has a lot of customer appeal and appreciably increases sales, because it facilitates use of the plastic mass. However, plastic materials, such as, for example, butter, generally adhere to surfaces with which they come in contact, and the handling of subdivided prints or sticks has long been a problem, difficult of solution by efficient and economical methods. In fact, there is no available commercial apparatus for producing and packaging conventionally shaped prints of butter and the like which have been subdivided into pats or patties. Accordingly, it is an object of the present invention to provide a method of and apparatus for defining formed and measured masses of plastic into predetermined units as they are produced and disposed into enwrapments.

In producing individual measured masses of plastic materials which adhere to surfaces with which they come in contact it is practically essential that such masses be cleanly separated or severed from the forming means to preserve the accuracy of measurement. It is also desirable to deposit or dispose the mass into an enwrapment and then to move the assembled plastic mass and enwrapment so that a portion of the interior surface of the enwrapment will wipe the separating or severing means to remove plastic material tending to adhere to the separating means. Another object of the present invention is to provide a method of and apparatus for defining subdivisions of measured plastic masses, designed and arranged to operate conjointly with the separating means and which will not interfere with the wiping thereof by the enwrapment.

A further object is to provide a method of and apparatus for producing and packaging measured and formed plastic masses having predetermined subdivisions defined therein by which the masses are received directly into an enwrapment as they are expelled and defined from the forming means. This minimizes handling of the masses, prevents possible dislocation of the subdivisions when they are completely defined, and reduces the possibility of contamination. In the handling of edible commodities, this sanitation feature is especially important.

Other objects and advantages of the present invention will become apparent from the following detailed description, accompanied by the drawings, in which:

Figure 1 is a fragmentary elevational view with parts broken away of a suitable form of apparatus including a preferred embodiment of the present invention;

Fig. 2 is an enlarged fragmentary perspective view showing details of a portion of the apparatus shown in Fig. 1; and Fig. 3 is a further enlarged fragmentary perspective view of a portion of the apparatus in Fig. 2 to illustrate details of the construction thereof.

The present invention relates to the production and packaging of masses of plastic materials. For the purpose of the present description, the term plastic material shall be construed to include a semi-plastic or plastic or partially set or solidified substance which under the conditions at the time it is being acted on may be formed or extruded by the use of relatively low pressures. Such materials may be flowed or forced through conduits or passages by the application of pressure. However, such materials will generally not flow under the influence of gravity to an appreciable extent. Examples of plastic materials which may be formed into masses having defined subdivisions and packaged in accordance with the present invention are butter, margarine, soap, lard and shortening as well as partially frozen materials such as ice cream, sherbets, etc.

A continuously operating mechanism is considered desirable in the production of formed and measured individual plastic masses, so that the plastic material may be flowed at a substantially constant and uniform rate to and through the apparatus. This not only increases the output of the unit, but results in greater accuracy in the measurement of the individual masses and prevents any adverse affects on the composition or physical characteristics of the plastic material due to intermittently applying and releasing pressure during intermittent flow. A very desirable mechanism for metering, forming and depositing individual masses of plastic material is illustrated in my copending application, Serial No. 126,213, filed November 8, 1949, and entitled Production of Accurately Measured Plastic Masses. Since the details of construction and operation of the mechanism for producing plastic masses are not considered an essential part of the present invention such details will not be completely described.

In carrying out the present invention it is considered preferable to utilize apparatus of a type having one or more molding cavities or pockets with a piston member slidably mounted in the molding cavity and actuated for movement to withdraw and form the desired molding cavity while in communication with a source of supply of plastic material, and adapted to move in a direction to expel a measured mass of plastic material at a discharge station. In the above identified co-pending application Serial No. 126,213, a pair of units for metering, forming and depositing plastic masses in the desired manner are interconnected and operated in timed relation so as to provide a substantially continuous and uniform flow of plastic material thereto. Figure 1 illustrates one of these units, and a description of the present invention in connection therewith is sufficient to permit understanding. It will be obvious that two or more such units may be operated in conjunction with each other as desired.

The numeral 1 indicates a portion of a conduit leading from a source of supply of plastic material under pressure and through which the material may be advanced to the unit by any suitable means, such as a helical screw or the like. The numeral 2 indicates a housing or casing of the unit which is broken away to reveal a portion of a rotary member 3 which is suitably apertured or recessed at one or more locations to receive for sliding movement one or more piston members 4. When the end face of the piston member 4 is opposite and in communication with the source of supply of plastic material under pressure, the piston member may be withdrawn by any suitable mechanism to provide a molding cavity or pocket 5 of the desired shape and size opening from the periphery of the rotary member 3. The rotor may then be advanced to a discharge station or zone where the molding cavity 5 is opposite an opening through the housing 2. In this discharge zone the piston member 4 may be suitably actuated to expel or eject a measured and formed mass of plastic material from the molding cavity. As described more completely in my previously mentioned copending application Serial No. 126,213, the molding cavity may be overfilled with plastic material and any excess thereof forced out against a predetermined force to increase the accuracy and uniformity of measurement of the plastic masses produced. This may occur between the intake and discharge stations. Further, at the discharge station, the plastic mass may be expelled while the rotary member 3 remains in motion or the rotary member may pause or dwell during expulsion of the plastic mass.

At the end of the discharge zone the opening through the housing may be defined by a suitably shaped plate member or blade 6 which acts to separate or sever the plastic mass from the molding cavity shearing the mass from the end face of the piston member 4 as the rotary member is moved past the blade. Adjacent the path of the molding cavity, one or more receiving members 7 may be provided, and these members may include angularly disposed receiving surfaces carried on arms 8 and mounted for movement in an endless path. Preferably, the angularly disposed receiving surfaces 7 are lined with a sheet material enwrapment 10. These enwrapments may comprise prefabricated sections of a suitable sheet material dimensioned to correspond to the masses to be formed. Before the members 7 reach the vicinity of the discharge station, the enwrapments may be applied to their receiving surfaces and if desired may be held securely in place such as by vacuum passages through the members opening to such receiving surfaces.

As may be seen in the lower right hand portion of Figure 1, the movement of the receiving member 7 and its enwrapment 10 may be arranged so that they pass closely adjacent the discharge station and a corner edge of the mass being discharged may be positioned within a complementary shaped trough afforded by the shaped enwrapment. As the member 7 is moved past the discharge station, the blade 6 completes the separation of the mass from the forming means. Also, the member 7 may be actuated to move in such a fashion that the interior surface of a trailing flap 11 of the enwrapment passes across and wipes the surface of the blade 6, to remove plastic material tending to adhere to the blade. With the mass deposited in the enwrapment, the member 7 may be moved to subsequent stations where the enwrapment may be enclosed about the mass in any of a number of conventional ways to provide a complete package.

In accordance with the present invention, the formed mass may be appropriately defined into a predetermined number of subdivisions while it is moving from the discharge station of the forming means and as it is received by the enwrapment and the member 7. This may readily be done by mounting a plurality of means for defining subdivisions of the formed masses so as to project partially or completely across the path of the mass as it is expelled from the forming means.

The drawings illustrate one very satisfactory way of accomplishing the desired results. A plurality of spaced elements such as wires 12 are mounted across the path of the plastic mass so that as the mass is expelled it is sliced or severed into a plurality of predetermined subdivisions which may be disposed in an enwrapment as a composite article and packaged. It is believed preferable that the elements or wires be mounted closely adjacent the blade 6 so that the mass will be apportioned as it is being expelled and separated from the forming means. Fig. 2 shows the plurality of wires mounted in an upper mounting bar 13 which may be secured to the housing 2 by the same screws or bolts 14 which hold the blades 6 to the housing. The opposite extremities of the wires 12 may be similarly mounted in a lower carrying bar 15 secured by bolts 16 to a pair of arms 17. The arms 17 may be pivotally mounted to the housing by suitable bolts 18 to facilitate the attachment of the wires 12 and the mountings thereof with the desired tension. To hold the arms in their appropriate adjusted position, adjusting bolts 20 may be provided with such bolts being threadedly mounted in projections or lugs 21 extending from the housing and having their end portions bearing against the arms 17. When the arms have been adjusted to the desired position they may be held securely by lock nuts 22 threadedly mounted on bolts 20 and bearing against the projections or lugs 21. As best illustrated in Fig. 3, the wires 12 may be mounted so that in their operative position, they are disposed in slots or recesses 23 in the end of the blade 6.

The wires 12 may comprise a plurality of individual strands held between the upper and lower mounting bars 13 and 15, or if desired, a single wire member may be used, extending in a sinuous path to provide the desired number of individual runs. An especially desirable method of mounting the wires to the bars 13 and 15 is to thread the wires through apertures in the bars and support and tension the wires individually. When all the wires are tensioned, or pre-stressed equally and at the desired amount, they may then be secured to the mounting bars, such as by silver solder or the like. With the wires secured to the bars they may be cut flush with the end faces of the bars and such end faces soldered, plated or otherwise treated to provide a smooth surface.

Thus, when sanitation requirements make it desirable to clean the mechanism, the mounting bars and wires may be readily removed and washed or steamed, sterilized if desired, and reattached to the machine. Attachment of the wires is simplified by the pivotal mounting of the arms 17. For example, the bar 13 may be secured to the housing by the screws 14 with the wires 12 and the bar 15 suspended therefrom. The adjusting bolts 20 may be loosened and the arms 17 pivoted to permit fastening of the bar 15 thereto while the wires are slack. Then by tightening the adjusting bolts 20, the wires 12 may be held across the path of the mass with the desired tension.

If desired, the wires 12 may be of suitable material and connected to a source of electrical current to heat the wires and maintain them at a temperature a little above the temperature of the plastic material and in this way any tendency of the plastic material to adhere to the wires will be decreased. Also, as has been described the trailing flap 11 of the wrapper 10 may be moved adjacent and wipe the wires 12 and the blade 6.

With the wires 12 held in a straight line and tangent to the periphery of the rotary member 3 and the expelling of the mass taking place during a relatively slow movement of the molding cavity, it may be seen that the wires will engage a corner of the mass and will enter and subdivide the mass with a smooth progressive motion. Such a cutting action is desirable to minimize or avoid uneven cutting or dislocation of any of the subdivisions of the mass.

It is also contemplated that in some cases it may not be desired to define subdivisions or portions of the mass by completely slicing or severing through the mass. For example, the blade 6 may be provided with fins or projections suitably positioned and dimensioned to extend into the path of the mass and score or mark one or more sides of the mass as it is moved into its enwrapment. If the mass is scored or marked in this fashion, the user may slice the mass into single or multiple units.

The present invention is especially advantageous for producing plastic masses having subdivisions or portions defined therein to be packaged as a single article. The definition of the subdivisions may be accomplished without interfering with the discharge of the measured and formed mass and its disposition directly into an enwrapment for packaging. The mass may be partially received in a formed enwrapment as it is being defined into subdivisions and as it is being separated from the forming means.

To obviate the possibility of the subdivisions being dislocated from the mass, end folds of the wrapper 10 may be partially formed prior to receiving the mass in the wrapper. By way of illustration, the member 7 may be provided with flanges or folder elements at each end thereof having an outline as indicated by the dotted line bearing numeral 24 in Fig. 1. These elements will form the edge portions of the wrapper 10 so that the wrapper will have an outline generally approximating a scoop. Preferably the folded edge portions are divergent to insure that the mass is completely received in the enwrapment. More complete details of this form of enwrapment and how they may be positioned within the receiving members may be had by reference to my copending application, Serial No. 139,845, filed January 31, 1950, and entitled Enwrapments and Use of Same.

Even though the mass be completely severed and the subdivisions packaged as a composite article without maintaining any separation between the subdivisions, it has been found that the mass does not reunite, and individual portions may be readily separated from the mass by gripping with the fingers or by interposing a knife blade or the like between adjacent portions. Also with the largest faces of the subdivisions juxtaposed, a compact package is provided.

It will be appreciated that in the drawings, proportions have been exaggerated in some instances to provide a greater understanding of the invention.

It will be understood that the foregoing description of preferred embodiments of the invention is for the purpose of explanation and illustration and numerous variations and modifications other than those which have been described may be made without departing from the spirit of the invention.

What I claim is:

1. The method of producing masses of plastic material which comprises forming a measured mass in a molding cavity, expelling said mass from said cavity, defining subdivisions of said mass as it is expelled from said cavity, separating said mass from said cavity, receiving said defined mass in an enwrapment, and wiping said defining and separating means with a portion of said enwrapment.

2. Apparatus for producing plastic masses which comprises a molding cavity, a source of supply of plastic material under pressure, a piston member mounted to control the amount of plastic material in said molding cavity and to expel a measured and formed mass of plastic material from said molding cavity, means for separating said mass from said molding cavity, a member movable adjacent said separating means and adapted to carry an enwrapment for receiving said mass from said molding cavity, and means for defining subdivisions in said mass as it is separated from said molding cavity and received in said enwrapment.

3. In apparatus for producing formed and measured masses of plastic material, a molding cavity movable in an arcuate path past a discharge station, means for expelling a plastic mass from said molding cavity, a member to carry an enwrapment movable past said discharge station to receive and convey a mass expelled from said molding cavity, and a plurality of elements disposed tangentially to the path of said molding cavity and between said molding cavity and member to subdivide said mass as it is expelled from said molding cavity and received in said enwrapment and member.

4. Apparatus for producing formed individual measured masses of plastic material which comprises a movable molding cavity, a piston mounted for sliding movement in said molding cavity to admit and expel plastic to and from said molding cavity, a blade mounted adjacent the path of said cavity to separate plastic masses therefrom as they are expelled by said piston, a member movable adjacent the path of said molding cavity to receive plastic masses from said cavity, and a plurality of spaced elements closely adjacent said blade to define subdivisions of said mass as it moves from said molding cavity to said receiving member.

5. Apparatus for producing plastic masses, which comprises a molding cavity, a source of supply of plastic material under pressure, a piston member mounted to control the amount of plastic material in said molding cavity and to expel a measured and formed mass of plastic material from said molding cavity, a member movable adjacent the molding cavity and adapted to carry a partially formed enwrapment for receiving said mass from said molding cavity and means for defining subdivisions in said mass as it is expelled from the molding cavity and received in said partially formed enwrapment.

CLARENCE W. VOGT.

References Cited in the file of this patent

UNITED STATES PATENTS

| Number | Name | Date |
|---|---|---|
| 586,387 | Lusted | July 13, 1897 |
| 636,839 | Pecht | Nov. 14, 1899 |
| 1,486,748 | Hilgers | Mar. 11, 1924 |
| 2,010,524 | McClatchie | Aug. 6, 1935 |